United States Patent [19]

Oliver et al.

[11] Patent Number: 4,507,553

[45] Date of Patent: Mar. 26, 1985

[54] METHOD AND APPARATUS FOR IDENTIFYING VANADIUM IN EARTH FORMATIONS

[75] Inventors: Donald W. Oliver; Walter H. Fertl, both of Houston, Tex.

[73] Assignee: Dresser Industries, Inc., Dallas, Tex.

[21] Appl. No.: 413,924

[22] Filed: Sep. 1, 1982

[51] Int. Cl.³ .................... G01V 5/10; G01N 23/222
[52] U.S. Cl. .................................... 250/270; 376/162
[58] Field of Search ................ 250/270; 376/162, 161

[56] References Cited

U.S. PATENT DOCUMENTS

| | | | |
|---|---|---|---|
| Re. 26,489 | 11/1968 | Rickard | 376/161 |
| 3,257,557 | 6/1966 | Youmans | 376/118 |
| 3,294,972 | 12/1966 | Youmans | 376/163 |
| 3,465,151 | 9/1969 | Youmans | 376/166 |
| 3,662,173 | 5/1972 | Youmans | 376/162 |
| 3,665,195 | 5/1972 | Youmans | 250/270 |
| 3,746,871 | 7/1973 | Kramer et al. | 376/162 |

Primary Examiner—Janice A. Howell
Assistant Examiner—Constantine Hannaher
Attorney, Agent, or Firm—Patrick H. McCollum; Richard M. Byron

[57] ABSTRACT

An activation well logging method and apparatus for identifying and measuring the presence of vanadium in earth formations surrounding a borehole. A well logging instrument including a source of neutrons is used to irradiate formations for a period of time sufficient to activate vanadium. The gamma radiation emanating from the irradiated formations are detected by a scintillation detector having output pulses directly proportional to the energies of the incident gamma rays. The output pulses having energies characteristic of the element vanadium are separated and counted to provide indication of any vanadium present in the irradiated formations.

3 Claims, 2 Drawing Figures

1

METHOD AND APPARATUS FOR IDENTIFYING VANADIUM IN EARTH FORMATIONS

BACKGROUND OF THE INVENTION

The present invention relates generally to radiological well logging methods and apparatus for investigating subsurface earth formations traversed by a borehole and, more particularly, to a method and an apparatus for identifying and measuring the element vanadium in subsurface formations.

It is known that crude oil contains minute amounts of a wide variety of miscellaneous substances, some organic and some inorganic. Several elements that have been identified in crude oil ash include silicon, iron, aluminum, lead, tin, nickel and vanadium. Most of these elements are found in sea water and may have been derived from it, either as compounds in colloidal suspension or as materials secreted by algae or other marine organisms, which may also have provided the material from which petroleum was formed. It is known that vanadium and nickel are concentrated in the porphyrins and replace the magnesium in chlorophyll, with the results that the vanadium and nickel content of crude oil is frequently several thousand times greater than the concentration in the earth's crust. Vanadium can be present in crude oils in the range of concentrations from between 0 to 6,000 ppm.

The making of a quantitative measurement of the vanadium content in crude oils is useful for several reasons. The combustion characteristics of vanadium in residual oil may conitbute to the deterioration of furnace linings and to the corrosion of boiler tubes or gas turbine blades. Catalyst poisoning by vanadium in refining processes may result in the formation of higher percentages of coke and gases at the expense of more desirable liquid products. Additionally, physical properties of crude oils, such as viscosity and flow rate, are related to vanadium content. For example, the viscosity of certain heavy crude oils is directly related to the concentration of vanadium. A good measurement of viscosity in heavy crude allows an optimal well stimulation technique, such as flooding, to be chosen to provide the most complete hydrocarbon recovery.

Accordingly, the present invention provides method and apparatus for identifying and measuring the element vanadium in-situ by radiological well logging.

SUMMARY OF THE INVENTION

A well logging instrument including a source of neutrons is positioned within a borehole and the adjacent earth formations are irradiated to cause activation of any vanadium present in the formations. De-excitation of the irradiated vanadium results in emission of gamma rays having a characteristic energy level. The returning gamma rays are detected by a scintillation detector having output pulses directly proportional to the energies by the incident gamma rays. The output pulses are transmitted to suitable electronics circuitry where they are separated according to their pulse height by a pulse selector which passes pulses of particular heights into separate channels. The pulses representative of the element vanadium are counted and recorded providing an indication and measurement of the presence of the element within the irradiated formations.

These and other features and advantages of the present invention can be understood from the following description of the techniques of producing the invention described in conjunction with the following drawings.

DETAILED DESCRIPTION OF THE PREFERRED EMBODIMENTS

One purpose of well logging is to identify the composition of the formations of the earth surrounding a well. In particular, hydrocarbons or hydrocarbon bearing formations are sought to be identified. Every chemical element has specifc and unique nuclear properties which may be measured. Therefore, nuclear measurements in a borehole may be used to determine that atomic composition of material around the borehole.

The present invention finds basis in the fact that every atomic nucleus possesses a unique scheme of energy states which may be excited subsequently loses this excess energy by the emission of one or more gamma rays or by the emission of a particle or particles, or both. When gamma rays are emitted, the quanta, in general, have energies corresponding to the excitation energy levels of the atom, or to differences between excitation energy levels. Thus, following nuclear excitation, an element which emits gamma rays always emits gamma rays which have an energy distribution characteristic of that element alone. By analysis of the gamma ray energy distribution, atomic composition of formations containing such elements may be determined.

Figure 1:
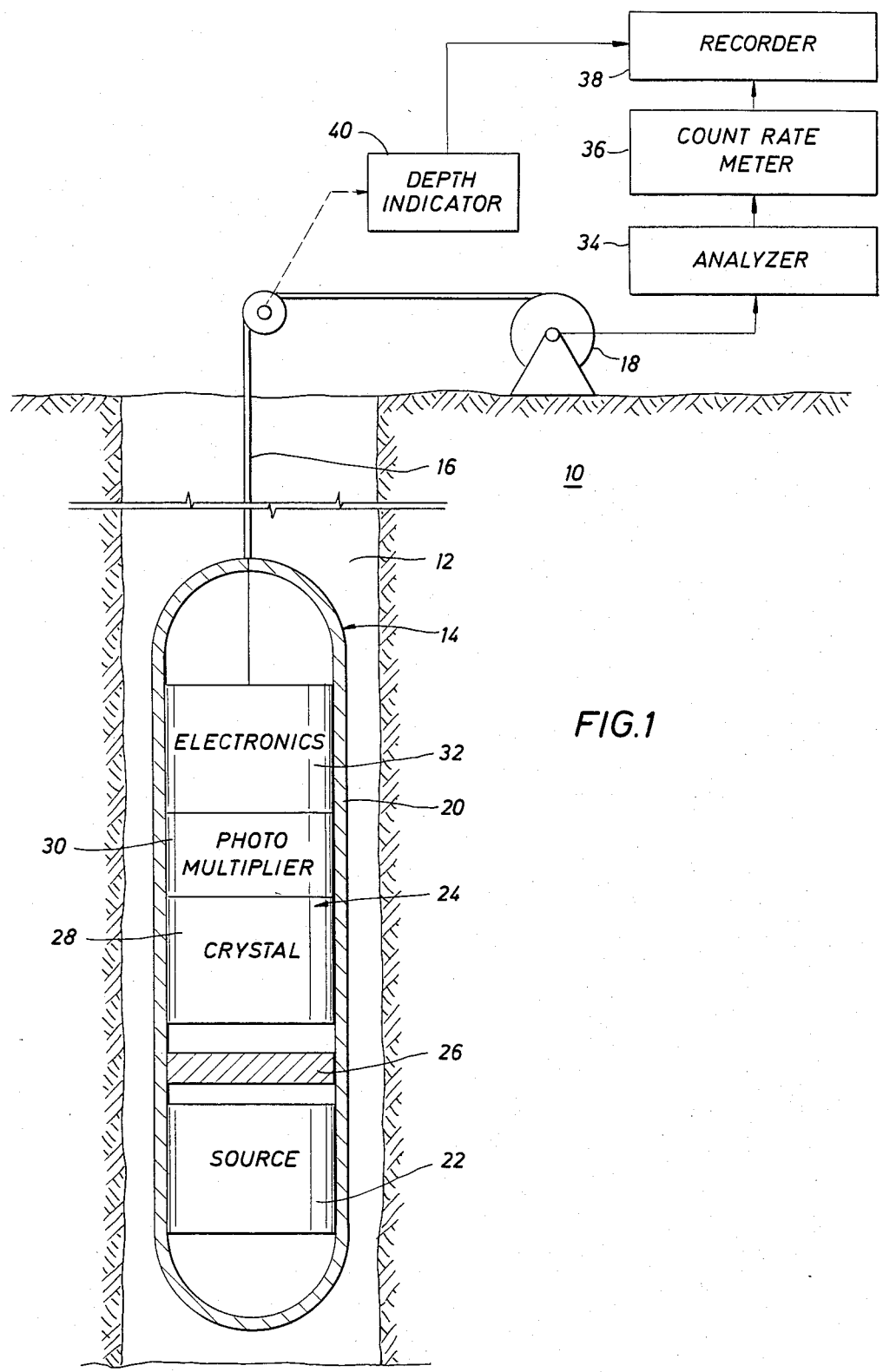
FIG. 1 is a side elevation, partly in cross section, of a borehold logging instrument in operative position and its associated circuitry and related equipment.

Referring now to the drawings in more detail, particularly to FIG. 1, there is illustrated schematically a radioactivity well surveying operation in which a portion of the earth formations 10 is shown in vertical section. Well 12 penetrates the earth's surface and may or may not be cased. Disposed within well 12 is subsurface instrument 14 of the well logging system. Cable 16 suspends instrument 14 in well 12 and contains the required conductors for electrically connecting instrument 14 with the surface apparatus. Cable 16 is wound on or unwound from drum 18 in raising and lowering instrument 14 to traverse well 12.

Subsurface instrument 14 comprises an elongated housing 20 which encloses a neutron source 22 and a radiation detector 24. Disposed between source 22 and detector 24 is radiation shield 26, which is made of any suitable material, such as paraffin. Source 22 can be any suitable source of thermal neutrons, such as a chemical source, for example an americium-beryllium or californium source, or an accelerator source using a D-T reaction to produce fast neutrons which degrade to thermal neutrons.

Radiation detector 24 comprises a crystal 28 and a photomultiplier 30. In the preferred embodiment, crystal 28 is NaI(Tl) crystal, however, a germanium detector or any similar gamma ray detector may be used. To protect detector 24 from the high temperatures encountered in boreholes the detector may be mounted in a Dewar flask.

In making a radioactivity log of the well, subsurface instrument 14 is positioned within well 12 adjacent earth formations of interest. Thereby, neutrons from source 22 irradiate the formations for a length of time sufficient to cause activation of vanadium. Irradiation should be for a time at least equal to the half-life of the characteristic gamma ray of vanadium and preferrably should be for approximately twenty minutes. After irradiation of the formations for a length of time sufficient for vanadium to reach saturation, instrument 14 is repositioned so that the radiation detector is adjacent the irradiated formations and gamma rays emanating from the formations are detected by crystal 28. The energies of these gamma rays are indicative of the elements in the formations from which they arise.

Crystal 28 responds to the impinging radiation by producing photons of light which are transmitted through crystal 28 to photomultiplier 30. For each gamma ray detected, the number of photons produced in the crystal and transmitted to photomultiplier 30 is proportional to the energy of the impinging gamma ray. Photomultiplier 30 converts these photons of light into electrons which are multiplied in the electron-multiplier section of photomultiplier 30 to produce pulses of magnitude proportional to the number of photons of light which reach its photocathode from crystal 28, and the resulting current pulses are transmitted to electronics section 32. The pulses are amplified in electronics section 32, then coupled through electrical conductors within cable 16 to the earth's surface. Electronics section 32 additionally houses all the power supply circuitry and other circuits necessary for the operation of instrument 14.

Through slip rings and brushes at the end of drum 18, the conductors in cable 16 are electrically connected to multichannel pulse analyzer 34. Multichannel pulse analyzer 34 sorts the signal pulses applied thereto into groups of pulses according to pulse energy. The energy grouping of pulses of interest are connected to count rate meter 36. Count rate meter 36 functions in a conventional manner to produce direct current voltages varying in magnitude in accordance with the rate of occurrence of input pulses. The direct current voltage output of count rate meter 36 is recorded by recorder 38. Recorder 38 records the input signal in correlation with movement of cable 18 by means of a timing signal provided from depth indicator 40.

Figure 2:
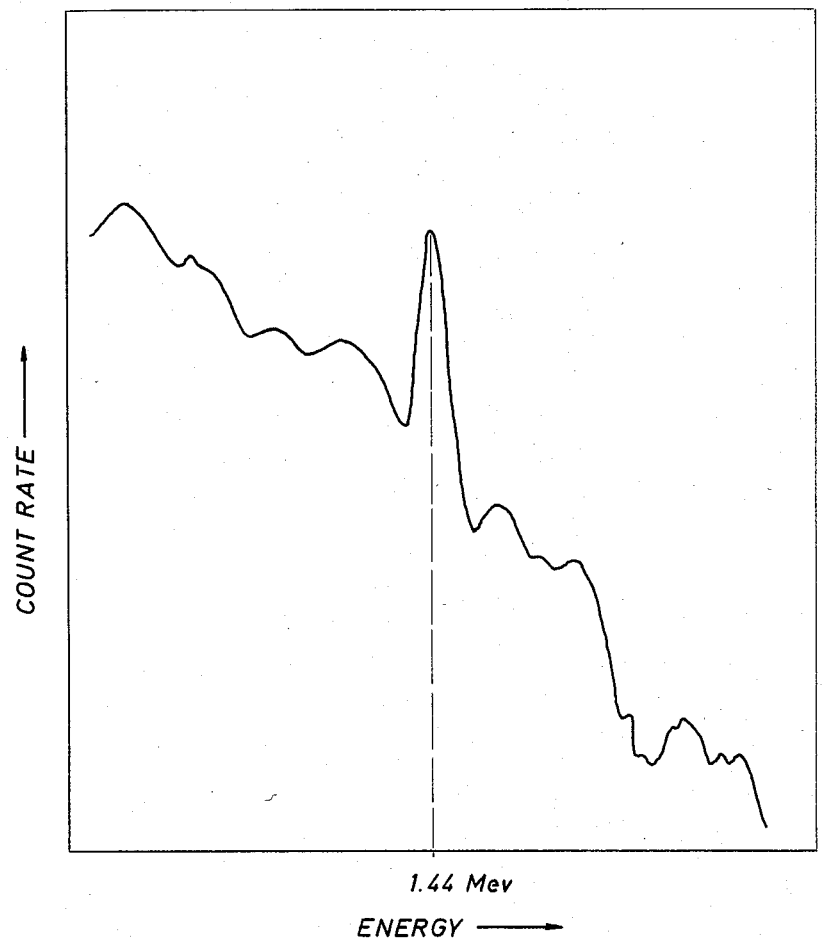
FIG. 2 graphically illustrates a representative gamma ray spectrum showing a characteristic vanadium photopeak.

Neutron activation analysis is based upon the quantitative detection of gamma radiation produced in samples by thermal neutron induced reactions. Induced activities are identified by the energies of their gamma ray photopeaks in the energy spectrum of the activated samples. FIG. 2 is a graphic representation of an energy spectrum illustrating the characteristic photopeak for the element vanadium. The determination of vanadium is done by gamma ray spectrometry of $^{52}V$ in the irradiated formations. The most prevalent isotope of vanadium is $^{51}V(99.76\%)$. Vanadium has a relatively large cross-section for neutron activation, 5.1 barns, forming the isotope $^{52}V$ by the reaction $^{51}V(\eta, \gamma)\ ^{52}V$. The $^{52}V$ created by this reaction de-excites by the emission of a 1.44 Mev gamma ray with a 3.76 minute half-life, as illustrated by the photopeak of FIG. 2. The multichannel analyzer can be set to measure the gamma rays within an approximately, plus or minus, ten percent range of the characteristic 1.44 Mev photopeak, or from approximately 1.30 Mev to 1.60 Mev. The length of the irradiation is usually at least equal to or greater than the half-life of the nuclide to be measured. The counts in the photopeak are directly proportional to the concentration of vanadium in the irradiation formations, thus by using a calibrated recording scale on recorder 38 the recorded measurement provides a direct vanadium concentration measurement.

Thus, there has been described and illustrated herein a new and improved method and apparatus for identifying and measuring the element vanadium in-situ. Those skilled in the art will recognize that numerous other variations and modifications may be made without departing from the scope of the present invention. For example, signal pulse sorting could be accomplished by use of a suitable adjusted integral discriminator located within the subsurface instrument. Additionally, techniques of spectral fitting and background subtraction can be employed.

The embodiments of the invention in which an exclusive property is claimed are defined as follows:

1. A method for determining the concentrations of vanadium in subsurface earth formations traversed by a borehole, comprising:

lowering a well logging instrument housing a source of neutrons and a gamma ray detector to a location within said borehole;

irradiating said subsurface earth formations adjacent said source with neutrons for a time period sufficient to cause activation of vanadium;

said time period being at least approximately equal to the half-life of the characteristic gamma ray of vanadium, said time period being at least approximately twenty minutes;

repositioning said well logging instrument within said borehole so that said detector is adjacent said irradiated earth formations;

dectecting gamma radiation emanating from said earth formations;

generating electrical pulse signals representative of said detected gamma radiation;

measuring the electrical pulse signals within an energy range from between 1.30 Mev to 1.60 Mev;

converting said measured electrical pulse signals within said energy range into a d.c. signal; and recording said d.c. signal in correlation with the depth within said borehole of said irradiated earth formations.

2. The method of claim 1 wherein said earth formations are irradiated with thermal neutrons using a chemical source.

3. The method of claim 1 wherein said earth formations are irradiated with neutrons using an acceleration source producing fast neutrons degrading to thermal neutrons.

* * * * *